United States Patent
Perotto

(10) Patent No.: US 6,338,500 B1
(45) Date of Patent: Jan. 15, 2002

(54) HYBRID GAS GENERATOR PROVIDED WITH AN INITIATOR WITH SHAPED EXPLOSIVE CHARGE

(75) Inventor: Christian Perotto, Ballancourt (FR)

(73) Assignee: Livbag SNC, Vertle Petit (FR)

( * ) Notice: Subject to any disclaimer, the term of this patent is extended or adjusted under 35 U.S.C. 154(b) by 0 days.

(21) Appl. No.: 09/490,146

(22) Filed: Jan. 24, 2000

(30) Foreign Application Priority Data

Jan. 25, 1999 (FR) .......................................... 99 00747

(51) Int. Cl.[7] ................................................ B60R 21/26
(52) U.S. Cl. .................... 280/741; 280/737; 102/202.5; 102/530
(58) Field of Search .............................. 280/737, 741; 102/476, 202.5, 530, 202.14

(56) References Cited

U.S. PATENT DOCUMENTS

| | | | |
|---|---|---|---|
| 3,191,533 A | 6/1965 | Hopson, III | 102/24 |
| 3,670,925 A | 6/1972 | Moyant | 222/3 |
| 4,648,319 A * | 3/1987 | Westerlund et al. | 102/202.5 |
| 5,005,486 A * | 4/1991 | Lenzen | 102/531 |
| 5,131,680 A | 7/1992 | Coultas et al. | 270/737 |
| 5,263,740 A | 11/1993 | Frey et al. | 280/737 |
| 5,468,015 A | 11/1995 | Goetz | 280/737 |
| 5,531,473 A * | 7/1996 | Rink et al. | 280/737 |
| 5,601,308 A | 2/1997 | Cuevas | 280/736 |
| 5,602,361 A | 2/1997 | Hamilton et al. | 102/288 |
| 5,603,525 A * | 2/1997 | Zakula | 280/737 |
| 5,668,345 A * | 9/1997 | Schroeder et al. | 280/741 |
| 5,782,486 A * | 7/1998 | Barnes et al. | 280/737 |
| 6,010,153 A | 1/2000 | Halas et al. | 280/737 |
| 6,106,008 A * | 8/2000 | Blackshire et al. | 280/737 |
| 6,146,598 A | 11/2000 | Duvacquier et al. | 422/166 |
| 6,196,584 B1 * | 3/2001 | Shirk et al. | 280/737 |

FOREIGN PATENT DOCUMENTS

EP 0 673 809 A1 9/1995

* cited by examiner

*Primary Examiner*—Lanna Mai
*Assistant Examiner*—Ruth Ilan
(74) *Attorney, Agent, or Firm*—Pillsbury Winthrop LLP

(57) ABSTRACT

The invention relates to a hybrid gas generator intended for motor vehicle safety.

The generator (1) includes a container (2) containing a cold gas (10) under pressure and having an open end in which a compartment (2), which is located outside the container (2), is fixed. This compartment (3) is provided with gas discharge orifices (6) and has a front wall (8) in which there is an opening closed by a diaphragm (9) which makes it possible to separate the inside of the container (2) from the inside of the compartment (3), in a leaktight fashion. The latter contains an initiator (12) with shaped explosive charge and a pyrotechnic charge (13), the initiator (12) being capable of destroying the diaphragm (9) from a distance and of initiating the pyrotechnic charge (13).

This generator (1) makes it possible to initiate deployment of the airbag using cold gas (10) as soon as it starts to operate.

22 Claims, 4 Drawing Sheets

HYBRID GAS GENERATOR PROVIDED WITH AN INITIATOR WITH SHAPED EXPLOSIVE CHARGE

The present invention relates to the field of motor vehicle safety, and more particularly concerns a hybrid gas generator which includes an initiator with shaped explosive charge and is intended to inflate an airbag for the occupant of a motor vehicle.

In order to minimize the risk of body injury suffered by the occupants of a motor vehicle in the event of a front or side impact, it was proposed thirty years ago to fit motor vehicles with gas generator systems for inflating front or side airbags.

Many of these generators are hybrid gas generators which have the feature of inflating the airbags through the release of a gas contained until then under pressure in a leaktight container, it also being possible to mix this gas with other gases resulting from the combustion of an associated pyrotechnic charge. These hybrid gas generators, which have been the subject of various patents, for example U.S. Pat. No. 5,602,361 and U.S. Pat. No. 5,131,680, generally have a mechanical component for releasing the gas held under pressure in the container which, at the appropriate time, tears a diaphragm or destroys a wall which had hitherto closed the container in a leaktight fashion. This mechanical release component is, for example, formed using a metal projector that can be propelled by a pyrotechnic effect. Unfortunately, there are genuine disadvantages with hybrid gas generators equipped with such mechanical release components. Specifically, the relatively large number of difficult-to-machine metal parts which are needed for producing such components give these generators, on the one hand, high manufacturing costs, which is a problem in a highly competitive market such as that of motor vehicle safety and, on the other hand, significant weight and bulk.

It has therefore been proposed, as described in U.S. Pat. No. 5,263,740, to replace this mechanical release component by an initiator with shaped pyrotechnic charge placed in contact with the diaphragm that closes the gas container in a leaktight fashion. The result of this is, however, on the one hand that the cold gas contained in the container is forced to pass through the initiator when the latter has torn the diaphragm, which has the effect of heating this gas so that it may then damage the airbag still folded around the generator and, on the other hand, that it is very difficult to accommodate an associated pyrotechnic charge, intended to be initiated using the initiator with shaped pyrotechnic charge, elsewhere than inside the container.

The person skilled in the art is therefore still trying to find an inexpensive hybrid gas generator with low weight and bulk which makes it possible to release cold gases as soon as the generator starts to operate, which can also contain an associated pyrotechnic charge accommodated outside or inside the container, and makes it possible to inflate both front airbags and side airbags.

The specific object of the present invention is to provide such a hybrid generator.

The invention therefore relates to a hybrid gas generator comprising a container having an open end in which a compartment, which is located outside the said container and is provided with gas discharge orifices, is fixed, the said compartment containing an igniting system and having an openable wall which initially makes it possible to separate the inside of the container from the inside of the compartment, in a leaktight fashion, the said container holding at least one gas under pressure, characterized in that the igniting system consists of an initiator with shaped explosive charge capable of destroying the openable wall of the said compartment from a distance.

Thus, by virtue of the presence in the generator of an initiator which, during operation, can deliver a shot consisting of a plasma for perforating the said wall of the compartment from a distance, the cold gas contained in the container is released into the compartment and can then escape directly through the gas discharge orifices and inflate the airbag, without having to undergo direct contact with the initiator.

Preferably, the container and the compartment are of cylindrical general shape, the axis of revolution of the said container and the axis of revolution of the said compartment being the same, and the initiator with shaped explosive charge is located on the same axis. The compartment may be made from a cylindrical hollow body having a side wall in which there are gas discharge orifices, a front wall in which there is an opening initially closed by a diaphragm, and an open end in which a closing ring, supporting the initiator with shaped explosive charge, is fixed.

Advantageously, the initiator with shaped explosive charge is an electrical initiator containing, on the one hand, a starting pyrotechnic composition relayed by a relay primary explosive and, on the other hand, a composite explosive comprising at least one binder and at least one nitramine, the said composite explosive being shaped in the form of a hollow charge. This relay primary explosive consists, for example, of penthrite or silver nitride and makes it possible to initiate the composite explosive forming the shaped charge. This type of initiator is highly effective in delivering a shot having a highly extended field of action.

According to a first alternative embodiment of the invention, the compartment may accommodate an associated pyrotechnic charge. This pyrotechnic charge is ignited using the initiator with shaped explosive charge and makes it possible, once some of the cold gas delivered from the compartment has initiated inflation of the airbag, to generate gases which mix with the cold gas in order to deploy the airbag fully.

Preferably, the associated pyrotechnic charge is in the form of an annular block arranged around the initiator with shaped explosive charge. Also preferably, the compartment has an internal partition provided with an opening closed by a diaphragm, the said internal partition making it possible to divide the said compartment into a first chamber for initiation and combustion containing the initiator with shaped explosive charge as well as the pyrotechnic charge, and a second chamber for mixing and discharging the gases which includes the openable wall and the gas discharge orifices.

Advantageously, the initiator with shaped explosive charge is formed using:
i) an igniting medium,
ii) a fragmentable cap having a hollowed bottom, a side wall and an open end fixed on the igniting medium, the said cap containing at least one explosive composition based on nitramine and the said side wall having at least one weakened zone,
iii) and an electrical initiation system connecting the igniting medium to a current source.

This initiator, which makes it possible to deliver a shot intended to break the openable wall of the compartment in order to release the cold gas contained in the container, thus also has a lateral weakened zone whose destruction during operation allows the gases generated by the initiator to come into contact with the associated pyrotechnic charge. This is particularly advantageous when the latter is in the form of an annular block arranged around the initiator.

Preferably, the fragmentable cap contains a reinforcing powder interposed between the open end of the cap and the explosive composition which is in contact with the hollowed bottom in a manner such that the said reinforcing powder is arranged in front of the weakened zone, it being possible for the latter to consist of a narrowed peripheral band of the side wall of the cap or of orifices in the said side wall which are closed by diaphragms. Also preferably, this reinforcing powder will be mixed with the relay primary explosive.

Advantageously, the igniting medium consists of an insulating medium on which a resistive heating element as well as the starting pyrotechnic composition are deposited, it being possible for the said resistive heating element to consist, for example, of a semiconductor bridge or a resistor wire which is connected to a current source using two pins which conduct the electric current, constituting the electrical initiation system.

According to a second alternative embodiment of the invention, an associated pyrotechnic charge may be accommodated in the container and arranged in front of the openable wall of the compartment. This pyrotechnic charge is ignited using the shot delivered by the initiator with shaped explosive charge and makes it possible, once some of the cold gas delivered from the compartment has initiated inflation of the airbag, to generate gases which mix with the cold gas in order to deploy the airbag fully.

Preferably, the pyrotechnic charge is placed inside a cup having a flat circular bottom and a side wall whose free end is fixed in the compartment.

Also preferably, the flat circular bottom has a central hole closed by a diaphragm, and the pyrotechnic charge, on the one hand, is wedged by a separating ring fixed in the side wall of the cup and, on the other hand, surrounds a starting relay device which rests on a profiled central orifice of the said separating ring.

Advantageously, the side wall of the cup has communicating orifices between its free end and the separating ring.

The invention also relates to an electro-pyrotechnic initiator comprising, in particular, an igniting medium in which the open end of a fragmentable cap containing at least one explosive composition is fixed, and an initiation system which makes it possible to connect the said igniting medium to an electric current source, characterized in that
   i) the fragmentable cap has a hollowed bottom whose inner surface is in contact with the explosive composition,
   ii) the cap has a side wall including at least one weakened zone.

According to a first alternative embodiment of the invention, the cap contains a reinforcing powder interposed between the open end of the cap and the explosive composition in a manner such that the reinforcing powder is arranged in front of the weakened zone.

According to a second alternative embodiment of the invention, the explosive composition consists of a composite explosive containing at least one binder and at least one nitramine. Advantageously, the cap contains a relay primary explosive. This relay primary explosive is advantageously mixed with a reinforcing powder, and this mixture is interposed between the open end of the cap and the explosive composition, so as to be arranged in front of the weakened zone.

Preferably, the weakened zone consists of a narrowed peripheral band of the side wall of the cap, or alternatively of orifices in the said side wall which are closed by diaphragms.

Advantageously, the diameter of the cap is at least equal to 8 mm, and the bottom is hollowed in the shape of a cone, the latter having a vertex angle at most equal to 30°.

Also advantageously, the igniting medium consists of an insulating medium on which a resistive heating element as well as a starting pyrotechnic composition are deposited, it being possible for the said resistive heating element to consist, for example, of a semiconductor bridge or a resistor wire arranged in contact with the starting pyrotechnic composition, and to be connected to an electric current source using an initiation system including two conductive pins. The initiation system may also consist of an optical cable combined with a laser device.

A hybrid gas generator according to the invention therefore provides a solution to the problem set out above, since:
   it does not require a mechanical component for releasing the gases,
   it allows the cold gas contained in the container to initiate the inflation of the airbag by virtue of opening the said container from a distance,
   it can contain an associated pyrotechnic charge that generates gas, both in the compartment and in the container,
   it makes it possible to inflate a side airbag of small volume, it then being possible for the gas source needed to inflate the bag to come exclusively from the gas contained under pressure in the container.

The preferred embodiment of a hybrid gas generator according to the invention, as well as two other possible embodiments, will be described below with reference to FIGS. 1 to 4.

Figure 1:
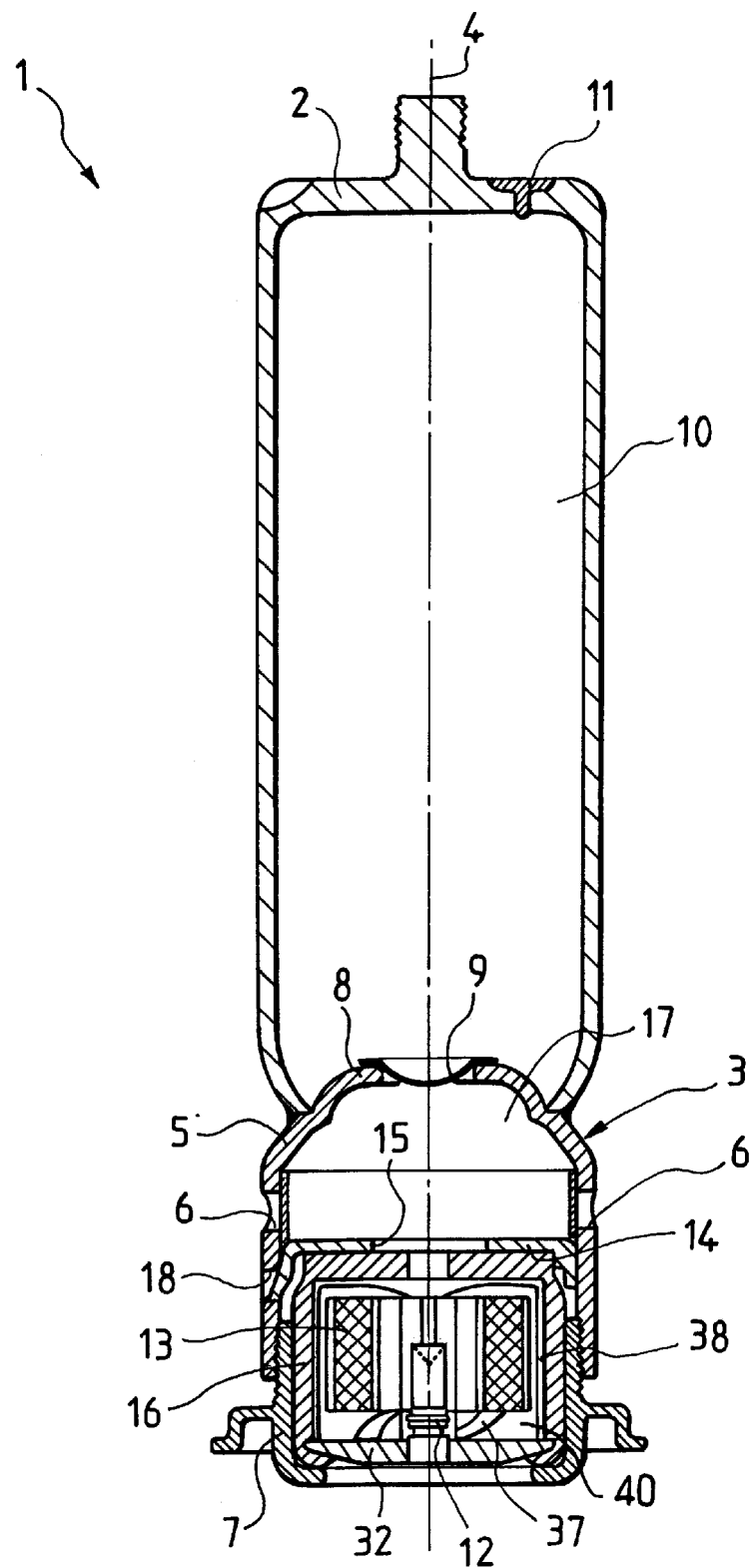
FIG. 1 is a view in longitudinal section of a hybrid gas generator according to the preferred embodiment of the invention.

Referring to FIG. 1, it can be seen that a hybrid gas generator 1 according to the preferred embodiment of the invention consists of a container 2 of cylindrical general shape which has an open end fixed by welding in a compartment 3, itself of cylindrical general shape, the axis of revolution 4 of the container 2 being the same as that of the compartment 3. The container 2 contains an inert cold gas 10 under pressure, for example argon, which is initially introduced through a valve 11 closed off by welding. The compartment 3 is made using a cylindrical hollow body 5 which has, on the one hand, a side wall provided with gas discharge orifices 6, this side wall ending in an open end in which a closing ring 7 is fixed by screwing, and, on the other hand, a front wall 8 in which there is an opening initially closed by a diaphragm 9. An internal partition 14, which is fixed in the side wall of the hollow body 5 by snap-fitting into perforations 18 and which is provided with an opening 15 closed by a diaphragm, divides the compartment 3 into a first chamber for initiation and combustion 40, and a second chamber for mixing and discharging the gases 17 which contains the front wall 8 as well as the gas discharge orifices 6. A pyrotechnic module is held in the initiation and combustion chamber 40 using the closing ring 7, and this pyrotechnic module is formed from a spacer ring 16 into which a cylindrical cover 38 is inserted. This spacer ring 16 has, on the one hand, a bottom provided with a central orifice bearing against the internal partition 3 and, on the other hand, an open end holding, by crimping, an initiator holder 32 into which an initiator 12 with shaped pyrotechnic charge is inserted, the initiator being described in detail below and itself being surrounded by a pyrotechnic charge 13. The latter is in the form of an annular block and the axis of revolution of this block as well as the initiator 12 is the same as the axis of revolution 4. A spring 37 accommodated between the initiator holder 32 and the annular block makes it possible to hold the said block in a stable position with the aid of the cylindrical cover 38.

Figure 2:
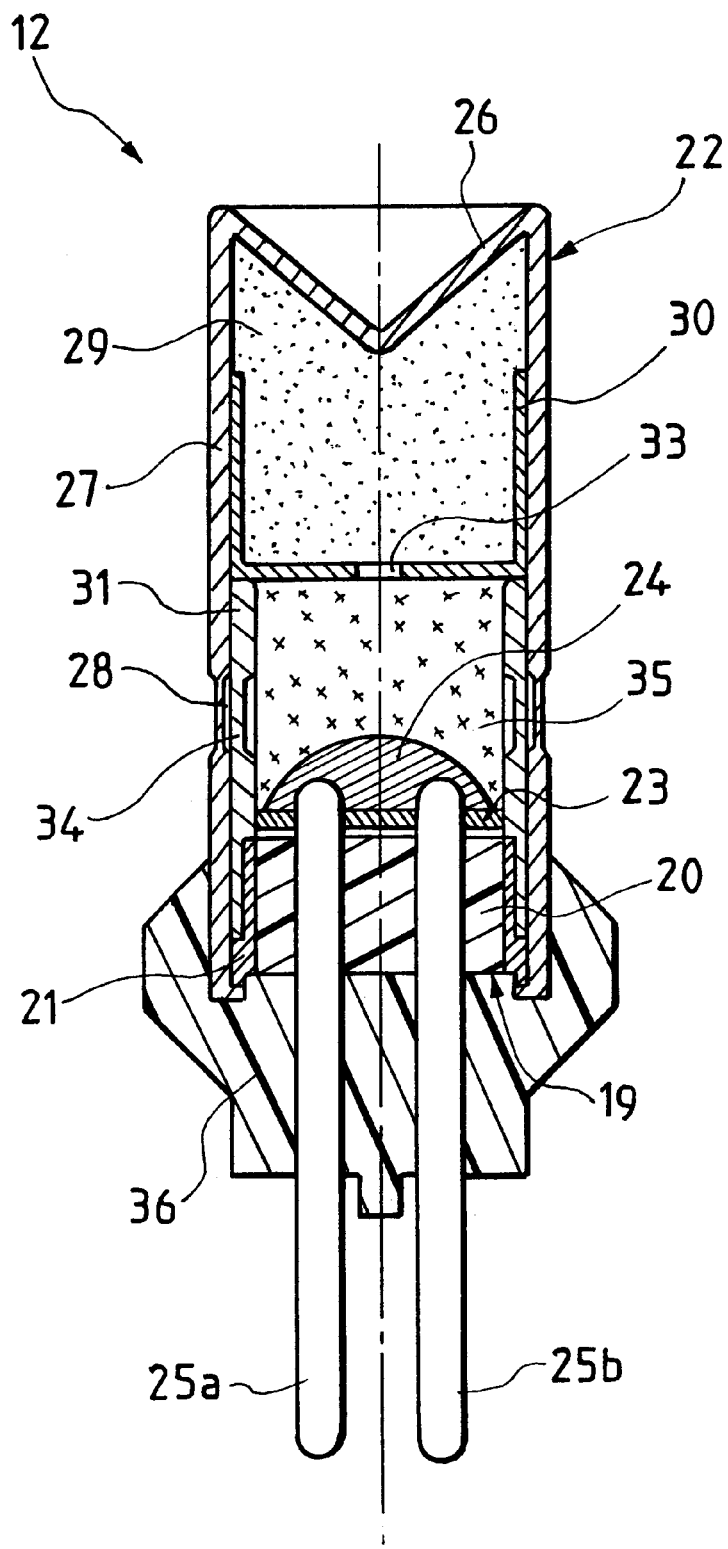
FIG. 2 is a view in longitudinal section of an initiator with shaped explosive charge contained in the generator represented in FIG. 1.

Referring more particularly to FIG. 2, it can be seen that the initiator 12 with shaped explosive charge is made from an igniting medium 19 comprising, on the one hand, a discoid insulating medium 20 framed by a washer 21, in which the free end of the side wall 27 of a fragmentable cylindrical cap 22 is fixed by crimping, and, on the other hand, a resistive heating element 23 in the form of thin semiconductor metal plates which are placed on the insulating medium 20 and are themselves covered by a starting pyrotechnic composition 24. An initiation system for connecting the initiator 12 to an electric current source (not shown) is formed using two metal pins 25a and 25b which are partly framed in the insulating medium 20 and each have an end in contact with the thin semiconductor plates.

More precisely, the cap 22 has a bottom 26 hollowed in the shape of a cone, and its side wall 27 has a weakened zone in the form of a narrowed peripheral band 28. The cap 22 contains an explosive composition 29 which is in contact with the bottom 26 and which fills the said cap 22 over about half the length of its side wall 27. This explosive composition 29, which is formed from a composite explosive containing at least one binder such as polybutadiene or polyglycidyl nitride and at least one nitramine such as hexogen or octogen, is held compact using a cylindrical insert 30 which bears on one of the two open ends of a cylindrical sleeve 31 the other open end of which abuts the washer 21. This insert 30 has a central perforation 33, and the sleeve 31 has a thin annular band 34 arranged in front of the narrowed peripheral band 28 of the cap 22. The cap 22 also contains a mixture 35 including a reinforcing powder and a relay primary explosive such as penthrite, this mixture 35 filling the volume bounded by the insert 30, the sleeve 31 and the thin semiconductor plates covered with the starting pyrotechnic composition 24.

Lastly, a thermoplastic resin overmould 36 partially encapsulates the two metal pins 25a and 25b and, with the cap 22, seals the initiator 12.

During operation, a firing current is delivered by the current source and is transmitted to the resistive heating element 23 of the initiator 12 via the metal pins 25a and 25b, which ignites the starting pyrotechnic composition 24 through the Joule effect, this igniting then leading to detonated ignition of the relay primary explosive of the mixture 35, and consequently to detonated initiation of the explosive composition 29 through the central perforation 33 of the insert 30. When it reaches the apex of the bottom 26, the detonation wave thus created gives rise to a perforating shot along the axis of revolution 4. This shot proceeds to successively break the cover 38, then the diaphragm closing the opening 15 and the diaphragm 9 closing the opening in the front wall 8 of the hollow body 5. The inert cold gas 10 can then start to escape through the said opening, enter the chamber for mixing and discharging the gases 17 and then finally escape through the gas discharge orifices 6 and initiate the deployment of the airbag (not shown).

In parallel with this, the gases generated by the combustion of the reinforcing powder of the mixture 35 successively lead to destruction of the thin annular band 34 of the sleeve 31, and of the narrowed peripheral band 28 of the cap 22. These gases then enter the initiation and combustion chamber 40 and ignite the pyrotechnic charge 13. The gases generated by the latter pass through the cover 38 and the opening 15, then mix with the inert cold gas 10 coming from the container 2 in the chamber for mixing and discharging the gases 17, and this mixture finally escapes through the gas discharge orifices 6 in order to inflate the airbag fully.

Figure 3:
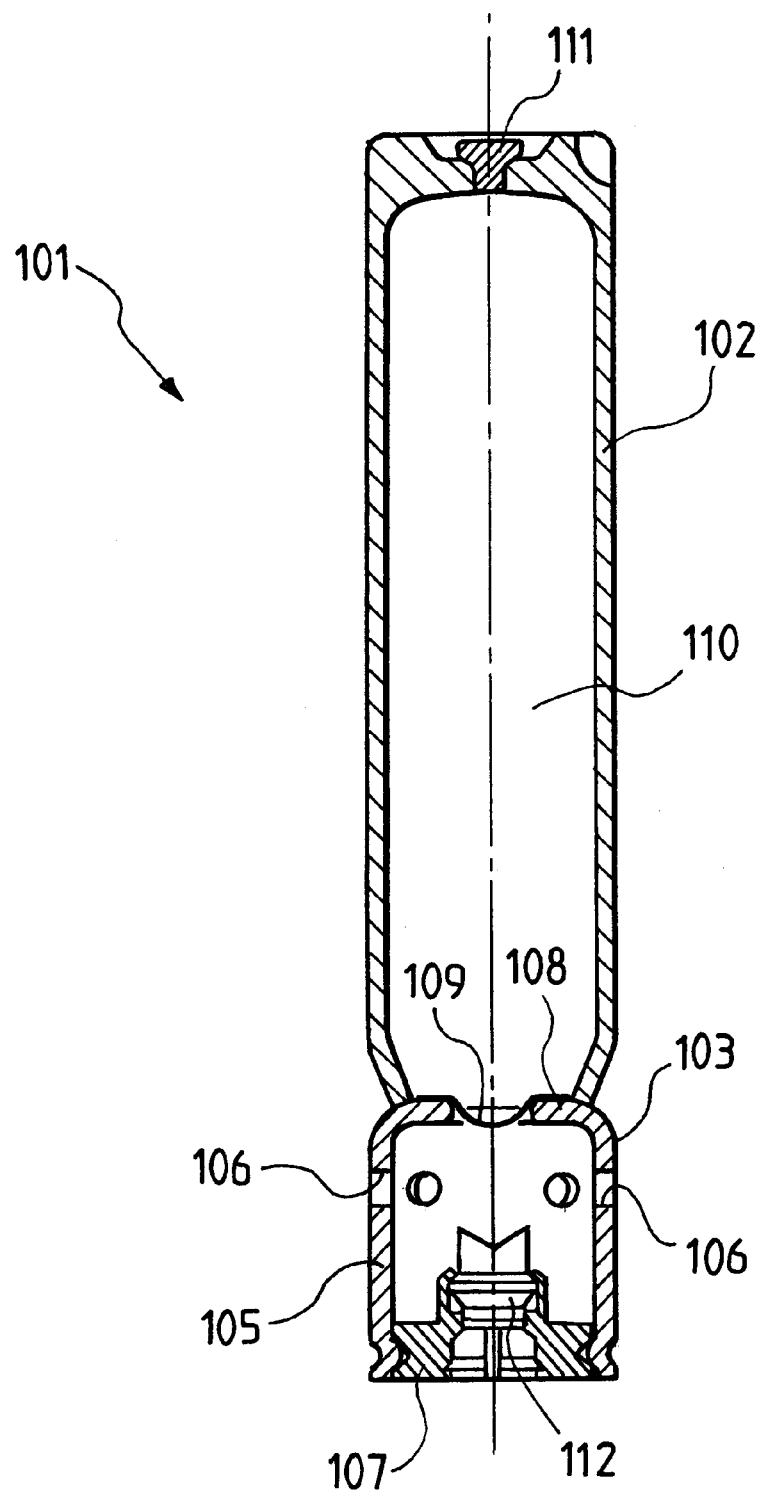
FIG. 3 is a view in longitudinal section of a hybrid gas generator according to another embodiment of the invention, for inflating a side airbag.

As represented in FIG. 3, it is possible to produce a hybrid gas generator 101 according to the invention more especially suited to the inflation of a side airbag.

In a similar way to what has been described above, this generator 101 is formed from a container 102 of cylindrical general shape which has an open end fixed by welding in a compartment 103, itself of cylindrical general shape. The container 102 contains an inert cold gas 110 under pressure which is introduced through a valve 111. The compartment 103 is produced using a hollow body 105 which has, on the one hand, a side wall provided with gas discharge orifices 106, this side wall ending with an open end in which a closing ring 107 is fixed by crimping and, on the other hand, a front wall 108 in which there is an opening initially closed by a diaphragm 109. An initiator 112 with a shaped explosive charge according to the invention is inserted into the closing ring 107 and is arranged in front of the diaphragm 109.

During operation, a firing instruction is transmitted to the initiator 112, and the latter then delivers a shot for perforating the diaphragm 109. The inert cold gas 110 can then escape from the container 102, then pass through the gas discharge orifices 106, then finally inflate the airbag.

Figure 4:
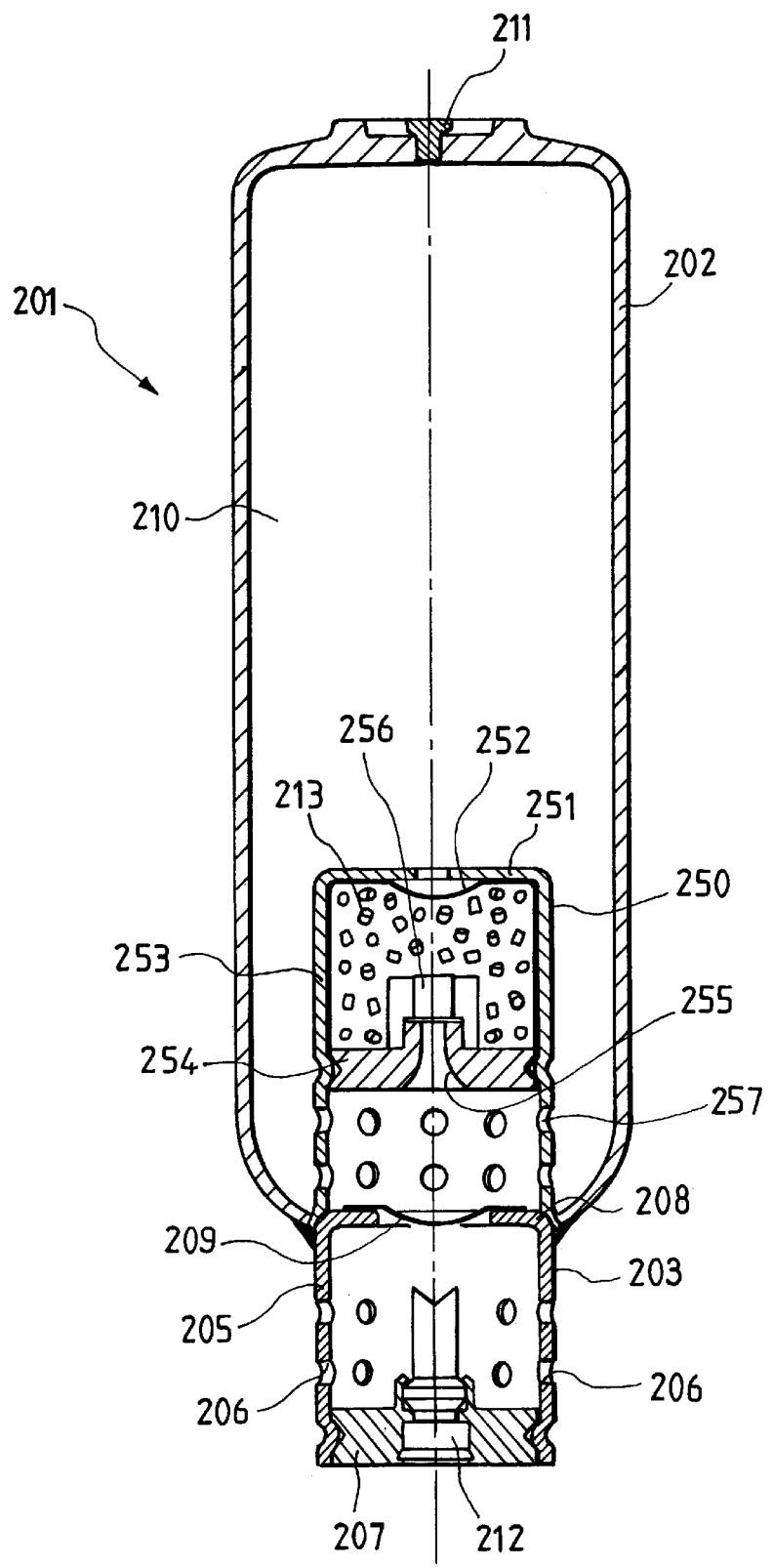
FIG. 4 is a view in longitudinal section of a hybrid gas generator according to another embodiment of the invention.

As represented in FIG. 4, it can be seen that there is another possible way of producing a hybrid gas generator 201 according to the invention.

In a similar way to what has been described above, this generator 201 is formed from a container 202 of cylindrical general shape which has an open end fixed by welding in a compartment 203, itself of cylindrical general shape. The compartment 203 is produced using a hollow body 205 which has, on the one hand, a side wall provided with gas discharge orifices 206, this side wall ending with an open end in which a closing ring 207 is fixed by crimping and, on the other hand, a front wall 208 in which there is an opening initially closed by a diaphragm 209. An initiator 212 with shaped explosive charge according to the invention is inserted into the closing ring 207 and is arranged in front of the diaphragm 209.

The container 202 contains a cylindrical cup 250 having, on the one hand, a flat circular bottom 251 which has a central hole closed by a diaphragm 252 and, on the other hand, a side wall 253 whose free end is fixed by welding in the compartment 203. A separating ring 254 is fixed by crimping in the side wall 253 of the cup 250 and has a profiled central orifice 255 on which a starting relay device 256 rests. A pyrotechnic charge 213 in the form of pellets is arranged around the starting relay device 256 and fills the volume bounded by the separating ring 254, the flat circular bottom 251 and the side wall 253 of the cup 250, the latter having undiaphragmed communication orifices 257 between its free end and the separating ring 254.

The container 202 also contains an inert cold gas 210 under pressure, which is introduced through a valve 211.

During operation, a firing instruction is transmitted to the initiator 212, and the latter then delivers a shot for perforating the diaphragm 209. The inert cold gas 210 under pressure can therefore start to escape from the container 202, then pass through the gas discharge orifices 206 to initiate the deployment of the airbag. The shot delivered by the initiator 212 furthermore initiates the starting relay device 256, which itself goes on to ignite the pyrotechnic charge 213. The gases generated by the latter, after having perforated the diaphragm 252, mix with the inert cold gas 210 in the container 202, pass through the communication orifices 257 of the cup 250, then escape from the container 202 to finally inflate the airbag fully after having passed through the gas discharge orifices 206.

Instead of the separating ring 254 which has a profiled central orifice 255, it is also possible to use a discoid separating ring provided with a simple central orifice. In this case, the starting relay device may be broken down, on the one hand, into a primer accommodated in the central orifice, and, on the other hand, a fragmentable cap which contains a reinforcing pyrotechnic composition and which lies on top of the said primer, the pyrotechnic charge then being arranged around the cap.

I claim:

1. Hybrid gas generator (1) comprising a container (2, 102, 202) having an open end in which a compartment (3, 103, 203), which is located outside said container (2, 102, 202) and is provided with gas discharge orifices (6, 106, 206), is fixed, said compartment (3, 103, 203) containing an igniting system and having an openable wall which initially makes it possible to separate the inside of the container (2, 102, 202) from the inside of the compartment (3, 103, 203), in a leaktight fashion, said container (2, 102, 202) holding at least one gas under pressure, the igniting system comprising an initiator (12, 112, 212) with shaped explosive charge capable of destroying the openable wall of said compartment (3, 103, 203) from a distance, the initiator (12, 112, 212) with shaped explosive charge comprising an electrical initiator containing:

i) a starting pyrotechnic composition (24) relayed by a relay primary explosive, ii) a composite explosive comprising at least one binder and at least one nitramine, said composite explosive being shaped in the form of a hollow charge, said compartment (3) accommodating a pyrotechnic charge (13) and having an internal partition (14) provided with an opening (15) closed by a diaphragm, said internal partition (14) making it possible to divide said compartment (3) into a first chamber for initiation and combustion (40) containing the initiator (12) with shaped explosive charge as well as the pyrotechnic charge (13), and a second chamber for mixing and discharging the gases (17) which includes the openable wall and the gas discharge orifice (6).

2. Hybrid gas generator (1, 101, 201) according to claim 1, characterized in that i) said container (2, 102, 202) and said compartment (3, 103, 203) are of cylindrical general shape, the axis of revolution (4) of the container (2, 102, 202) and the axis of revolution of the compartment (3, 103, 203) being the same, ii) the initiator (12, 112, 212) with shaped explosive charge is located on the axis of revolution (4) of said container (2, 102, 202) and of said compartment (3, 103, 203).

3. Hybrid gas generator (1, 101, 201) according to claim 2, characterized in that the compartment (3, 103, 203) comprises a cylindrical hollow body (5, 105, 205) having a side wall which includes said gas discharge orifices (6, 106, 206), said openable wall (8, 108, 208) in which there is an opening initially closed by a diaphragm (9, 109, 209), and an open end in which a closing ring (7, 107, 207), supporting the initiator (12, 112, 212) with shaped explosive charge, is fixed.

4. Hybrid gas generator (1) according to claim 1, characterized in that the pyrotechnic charge (13) is in the form of an annular block arranged around the initiator (12) with shaped explosive charge.

5. Hybrid gas generator (1) comprising a container (2, 102, 202) having an open end in which a compartment (3, 103, 203), which is located outside said container (2, 102, 202) and is provided with gas discharge orifices (6, 106, 206), is fixed, said compartment (3, 103, 203) containing an igniting system and having an openable wall which initially makes it possible to separate the inside of the container (2, 102, 202) from the inside of the compartment (3, 103, 203), in a leaktight fashion, said container (2, 102, 202) holding at least one gas under pressure, the igniting system comprising an initiator (12, 112, 212) with shaped explosive charge capable of destroying the openable wall of said compartment (3, 103, 203) from a distance, the initiator (12, 112, 212) with shaped explosive charge comprising an electrical initiator containing:

i) a starting pyrotechnic composition (24) relayed by a relay primary explosive, ii) a composite explosive comprising at least one binder and at least one nitramine, said composite explosive being shaped in the form of a hollow charge, said compartment (3) accommodating a pyrotechnic charge (13) in the form of an annular block arranged around the initiator (12) with shaped explosive charge, said initiator comprising i) an igniting medium (19), ii) a fragmentable cap (22) having a hollowed bottom (26), a side wall (27) and an open end fixed on the igniting medium (19), said cap (22) containing said composite explosive (29) based on nitramine and said side wall having at least one weakened zone, iii) and an electrical initiation system connecting the igniting medium (19) to a current source.

6. Hybrid gas generator (1) according to claim 9, characterized in that the cap (22) contains a reinforcing powder interposed between the open end of the cap (22) and the explosive composition (29) which is in contact with the bottom (26) in a manner such that said reinforcing powder is arranged in front of the weakened zone.

7. Hybrid gas generator (1) according to claim 5, characterized in that the weakened zone comprises a narrowed peripheral band (28) of the side wall (27).

8. Hybrid gas generator (1) according to claim 5, characterized in that the igniting medium (19) comprises an insulating medium (20) on which a resistive heating element (23) as well as the starting pyrotechnic composition (24) are deposited.

9. Hybrid gas generator (1) according to claim 8, characterized in that the electrical initiation system comprises two pins (25a, 25b) which conduct the electric current and are connected to the resistive heating element (23).

10. Hybrid gas generator (1) according to claim 8, characterized in that the resistive heating element is a semiconductor bridge.

11. Electro-pyrotechnic initiator (12) comprising an igniting medium (19) to which the open end of a fragmentable cap (22) containing at least one explosive composition (29) is fixed, and an initiation system which makes it possible to connect said igniting medium (19) to an electric current source, characterized in that i) the cap (22) has a hollowed bottom (26) whose inner surface is in contact with the explosive composition (29), ii) the cap (22) has a side wall (27) including at least one weakened zone.

12. Elecro-pyrotechnic initiator (12) according to claim 11, characterized in that the explosive composition (29) comprises a composite explosive containing at least one binder and at least one nitramine.

13. Electro-pyrotechnic initiator (12) according to claim 12, characterized in that the cap (22) contains a relay primary explosive.

14. Electro-pyrotechnic initiator (12) according to claim 11, characterized in that the cap (22) contains a reinforcing powder interposed between the open end of the cap (22) and the explosive composition (29) in a manner such that the reinforcing powder is arranged in front of the weakened zone.

15. Electro-pyrotechnic initiator (12) according to claim 12, characterized in that the cap (22) contains a mixture (35) formed by a reinforcing powder and a relay primary explosive, said mixture (35) being interposed between the open end of the cap (22) and the explosive composition (29) so as to be arranged in front of the weakened zone.

16. Electro-pyrotechnic initiator (12) according to claim 11, characterized in that the weakened zone comprises a narrowed peripheral band (28) of the side wall (27).

17. Electro-pyrotechnic initiator (12) according to claim 11, characterized in that the diameter of the cap (22) is at least equal to 8 mm.

18. Electro-pyrotechnic initiator (12) according to claim 11, characterized in that said bottom (26) is hollowed in the shape of a cone and has a vertex angle at most equal to 30°.

19. Electro-pyrotechnic initiator (12) according to claim 11, characterized in that the igniting medium (19) comprises an insulating medium (20) on which a resistive heating element (23) as well as a starting pyrotechnic composition (24) are deposited.

20. Electro-pyrotechnic initiator (12) according to claim 19, characterized in that the initiation system comprises two pins (25a, 25b) which conduct the electric current and are connected to the resistive heating element (23).

21. Electro-pyrotechnic initiator (12) according to claim 19, characterized in that the resistive heating element (23) is a semiconductor bridge.

22. Electro-pyrotechnic initiator (12) according to claim 19, characterized in that the resistive heating element is a resistor wire arranged in contact with the starting pyrotechnic composition (24).

* * * * *